(12) United States Patent
Cope et al.

(10) Patent No.: US 6,320,727 B1
(45) Date of Patent: Nov. 20, 2001

(54) ROLLER GUIDING SYSTEM FOR DELIVERY OF TAPE MEDIA ALONG A TAPE PATH

(75) Inventors: J. Robert Cope, Atwood; James Zweighaft, Boulder, both of CO (US)

(73) Assignee: Benchmark Tape Systems Corporation, Boulder, CO (US)

( * ) Notice: Subject to any disclaimer, the term of this patent is extended or adjusted under 35 U.S.C. 154(b) by 0 days.

(21) Appl. No.: 09/370,977

(22) Filed: Aug. 10, 1999

(51) Int. Cl.$^7$ .......................... G11B 15/60; B65H 23/025; B65H 23/038
(52) U.S. Cl. .................... 360/130.21; 226/189; 226/190; 226/195
(58) Field of Search ........................... 360/130.21, 130.2, 360/95, 85; 242/346, 346.1, 346.2; 226/196.1, 189, 190, 191, 192, 193, 194, 195

(56) References Cited

U.S. PATENT DOCUMENTS

| | | | |
|---|---|---|---|
| 3,334,835 | * | 8/1967 | Kaneko . |
| 3,405,855 | * | 10/1968 | Daly et al. . |
| 4,017,897 | * | 4/1977 | Blanding . |
| 4,335,857 | * | 6/1982 | Pfost et al. . |
| 4,427,166 | * | 1/1984 | Oishi et al. . |
| 4,697,759 | * | 10/1987 | Henderson et al. . |
| 5,173,828 | * | 12/1992 | Tanzer et al. .................... 360/130.21 |
| 5,414,585 | * | 5/1995 | Saliba .............................. 360/130.21 |
| 5,860,612 | * | 1/1999 | Runyon et al. ................... 242/346.1 |

FOREIGN PATENT DOCUMENTS

| | | | |
|---|---|---|---|
| 57-158058 | * | 9/1982 | (JP) . |
| 58-128046 | * | 7/1983 | (JP) . |
| 09-306141 | * | 11/1997 | (JP) . |

* cited by examiner

Primary Examiner—Craig A. Renner
(74) Attorney, Agent, or Firm—Duft, Graziano & Forest, P.C.

(57) ABSTRACT

A roller guiding system for delivery of magnetic tape media along a tape path between a tape drive employing a single reel and a tape cartridge employing a single reel. The roller guiding system comprises a plurality of guide rollers configured to adjust the path of travel of the tape media during tape drive operation to maintain tracking of the tape media with a tape head.

4 Claims, 4 Drawing Sheets

ROLLER GUIDING SYSTEM FOR DELIVERY OF TAPE MEDIA ALONG A TAPE PATH

FIELD OF THE INVENTION

The invention relates to digital tape drive storage devices, and in particular, to an improved roller guiding system for delivery of magnetic tape media along a tape path between a tape drive employing a single reel and a tape cartridge employing a single reel.

PROBLEM

Digital data is stored on tape drives utilizing a variety of designs, but in all cases, magnetic tape media is wound between a pair of tape reels as data is transferred to or from the tape media. In the art of data storage, the physical space required to store data is an important concern. To conserve space, tape drives often use a single reel tape cartridge design. The single reel design utilizes a supply reel located within the tape cartridge and a takeup reel located within the tape drive. After the tape cartridge is inserted into the tape drive, the tape media is connected to the takeup reel and wound along a tape path internal to the tape drive.

One example of a tape path is a guide roller tape path located between the supply reel and the takeup reel. The guide roller tape path uses a plurality of guide rollers to guide the tape media as it is wound between the supply reel and the takeup reel. Guide roller tape paths have the advantage of reducing friction in the tape path to that of rolling friction caused by components such as ball bearings.

A tape transducer, or tape head as it is commonly referred to in the art, located in the tape path, reads and writes digital data as the tape media passes over the tape head. The digital data is written and read from the tape media in tracks running in a longitudinal direction relative to the tape media. To read or write data on a specific track, the tape head must align with that track as the tape media passes over the tape head. To prevent errors in reading and writing data, the tape path traveled by the tape media must be reproducible with a high degree of accuracy. For purposes of this application tracking is defined as the alignment of the tape head with an individual tape track on the tape media.

Improvements in the art of tape heads have increased the number of tracks that can be included on magnetic tape media. As a result, individual tracks are narrower and require higher tolerances of tape path reproducibility to maintain alignment of a desired track with the tape head. Alignment of a specific tape track with the tape head is especially critical during data writing because a misalignment can result in writing over data contained on adjacent tracks.

It is a problem in tape drives employing a guide roller tape path to achieve these high tolerances in tape path reproducibility in light of the narrower tracks on the tape media. The quality of reading and writing data is functionally related to the tape media to tape head contact and the alignment of the desired tape track with the tape head. The alignment of a desired tape track with the tape head and the tape media to tape head contact is affected by several factors during tape drive operation. One factor is tape tension during winding of the tape media through the tape path. Inconsistencies in tape tension move the tape media slightly up or down as it passes over the guide rollers. This movement causes the stationary tape head to lose tracking of a particular tape track.

Another factor is inconsistencies in tape cut. Industry standards permit a positive or negative variation in tape media width of approximately 0.0004 inches over the length of the tape media. These variations also cause the tape media to move slightly up or down the guide rollers causing the tape head to lose tracking. Yet another factor is tape stretch due to wear. Over the course of tape media life, friction in the tape path causes tape degradation that affects how the tape media travels through the tape path.

For these reasons, a need exists in the art for an improved roller guiding system that provides improved tracking of tape media as it is wound through the tape path.

SOLUTION

The present invention overcomes the problems outlined above and advances the art by providing an improved roller guiding system for delivery of tape media along a tape path. A first advantage of the present roller guiding system is the formation of a dynamic tape path that continually realigns the desired tape track with the tape head during tape drive operation. A second advantage of the present roller guiding system is improved tracking and tension control. A third advantage of the present roller guiding system is a substantial increase in the number of tape tracks accommodated by a tape drive employing the roller guiding system. A fourth advantage of the present roller guiding system is a reduction in errors during tape drive operation.

The roller guiding system comprises a plurality of guide rollers configured to continually adjust the tape media path of travel during tape drive operation to maintain alignment of the tape head with a particular tape track. In a first embodiment of the roller guiding system, four guide rollers are used to guide the tape media along the tape path between the takeup reel in the tape drive and the supply reel in the tape cartridge. A first pair of guide rollers are identical in design and operation and include a central crown on their tape media contact surfaces. A second pair of guide rollers are identical in their design and operation and include a tapered tape media contact surface that travels from a widest point at the top of the guide roller to a narrowest point at the bottom of the guide roller. All four guide rollers include a tape media contact surface that is slightly wider than the tape media to allow the tape media to pass unobstructed over the tape media contact surface of each guide roller.

The second pair of guide rollers are connected to the tape drive deck between the first pair of guide rollers. The tape head is located between the second pair of guide rollers. During operation of the tape drive, the tapered contact surface of the second pair of guide rollers applies an upward force on the tape media causing it to maintain constant alignment with the top edge of the second pair of guide rollers. As the tape media varies during winding the upward force holds the tape media against the top edge of the guide rollers, which in turn realigns the tape track with the tape head.

In a second embodiment of the roller guiding system, the tapered contact surface of the second pair of guide rollers is inverted and travels from a widest point at the bottom of the guide roller to a narrowest point at the top of the guide roller. In preferred embodiments at least one of the guide rollers includes spiral grooves circumscribing its tape media contact surface.

DETAILED DESCRIPTION

The invention summarized above and defined by the enumerated claims may be better understood by referring to the following detailed description, which should be read in conjunction with the accompanying drawings. This detailed description of the preferred embodiment is not intended to limit the enumerated claims, but to serve as a particular example thereof. In addition, the phraseology and terminology employed herein is for the purpose of description, and not of limitation.

Figure 1:
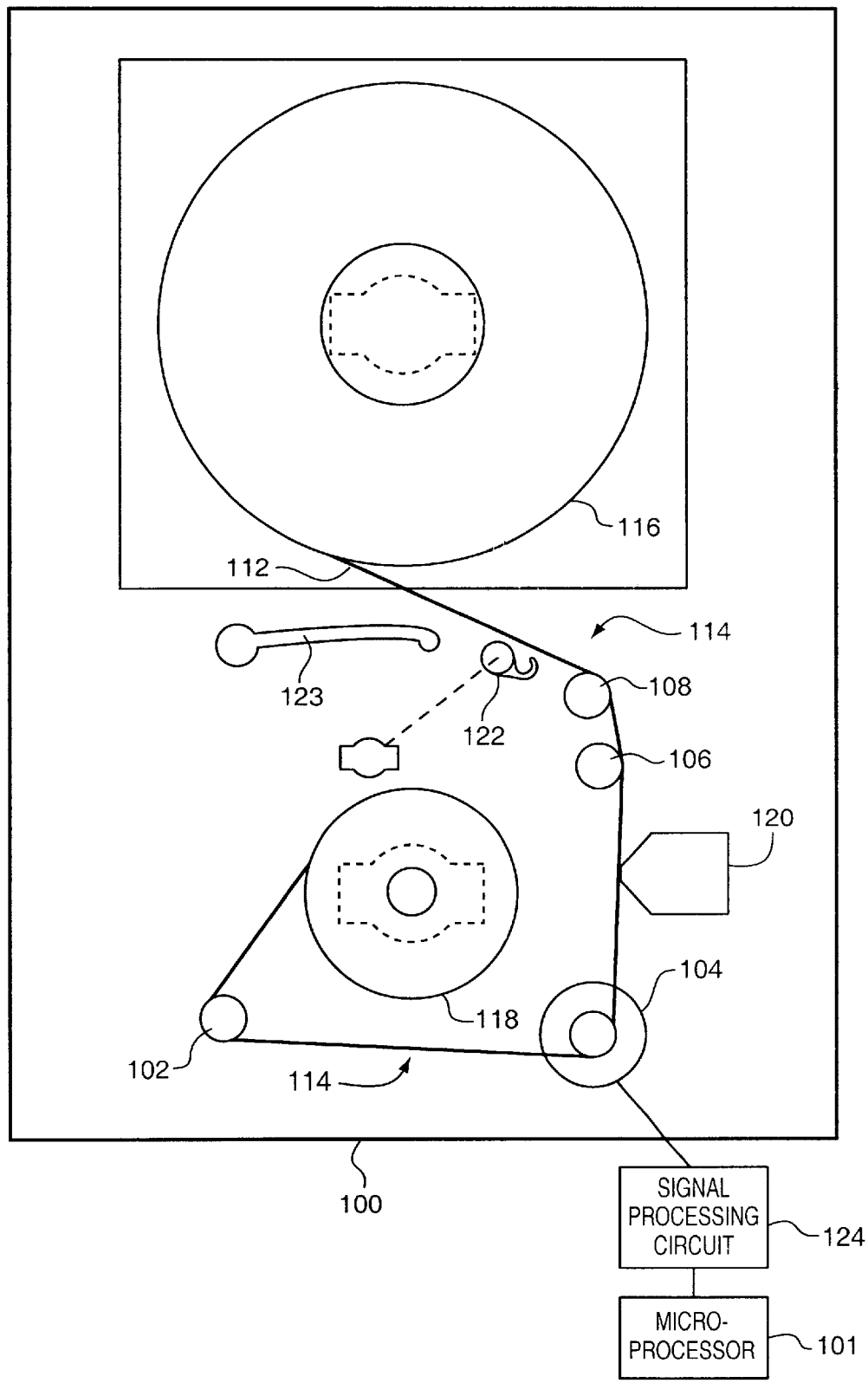
FIG. 1 illustrates a plan view of a tape drive embodying the guiding system of the present invention.

FIG. 1 illustrates tape drive 100 embodying the roller guiding system of the present invention. In FIG. 1 magnetic tape media 112 is wound between supply reel 116 and takeup reel 118 through tape path 114. Tape path 114 comprises guide rollers 102, 104, 106 and 108 and tape head 120.

Tape drive 100 also includes other components commonly known in the tape drive art, such as catch 122 and positioning lever 123, used to connect and load tape media 112 into tape drive 100.

Microprocessor 101 and signal processing circuit 124 control tape drive operation.

Microprocessor 101 and signal processing circuit 124 are a conventional circuit and processor configured with software to operate in accord with the various embodiments of the invention. The software will be apparent to those skilled in the art in the context of the following discussion.

The major components of the roller guiding system of the present invention are two pairs of guide rollers. A first pair of guide rollers comprise a first guide roller 108 and a second guide roller 102, and a second pair of guide rollers comprise a third guide roller 104 and a fourth guide roller 106.

Guide Rollers 102 and 108

Figure 2:
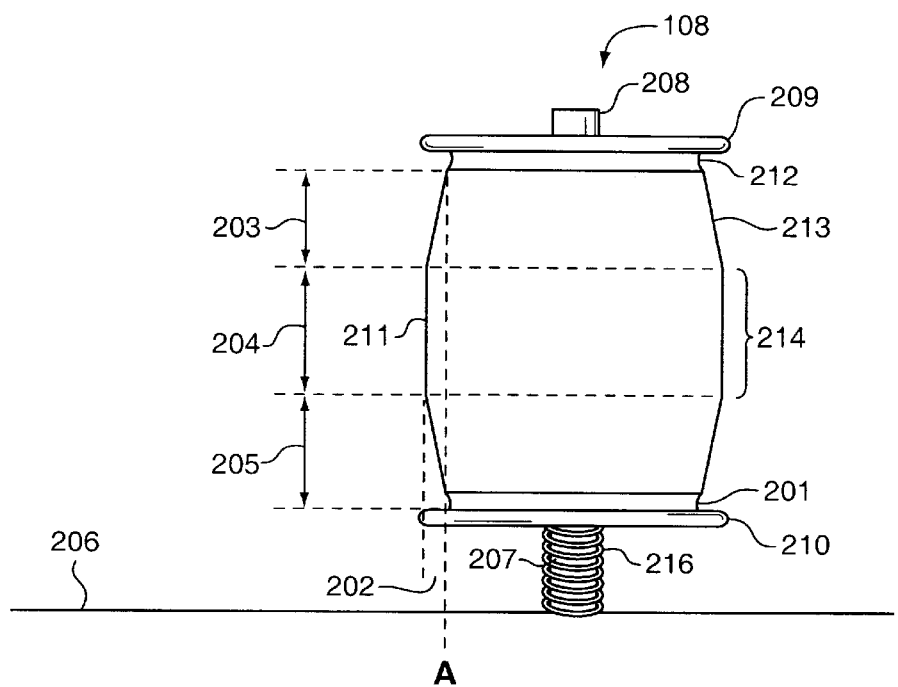
FIG. 2, illustrates a perspective view of a guide roller of the preset invention.

FIG. 2 illustrates a perspective view of guide roller 108 of the present invention. Guide roller 108 and guide roller 102 are identical in all aspects of their design and operation. Accordingly, the following description is directed to guide roller 108, with identical features being present in guide roller 102.

Guide roller 108 comprises a pair of circular disks 209 and 210 integrally formed around a top and a bottom of a main body 213. Main body 213 includes a tape media contact surface 211 circumscribing main body 213 and disposed between channels 212 and 201. Channels 212 and 201 are formed around the top and the bottom of tape media contact surface 211. Channels 212 and 201 aid in the manufacturing guide roller 108 by forming a right angle at the contact point between tape media 112 and the respective surface of disks 209 and 210.

On FIG. 2 tape media contact surface 211 is divided into three sections 203, 204 and 205, each of which represents approximately a third of the total tape media contact surface 211. The center third 204 of tape media contact surface 211 includes a central crown 214 formed by the tapered slope of tape media contact surface 211 in sections 203 and 205. To simplify the manufacturing of guide roller 108, tape media contact surface is tapered inward along sections 203 and 205 to form a planer crown 214 in section 204. As one skilled in the art would readily understand planer crown 214 is easily manufactured compared to alternative designs such as an arcuate crown. In preferred embodiments, the height 202 of crown 214 is in the range of 0.0005 inches and 0.0015 inches and more preferably is 0.001 inches relative to datum line A.

A preferred feature of the invention is that tape media contact surface 211 is dimensioned slightly wider than tape media 112 allowing tape media 112 to pass over tape media contact surface 211 without contacting either disk 209 or 210. Reducing contact points in the tape path minimizes the likelihood of deforming tape media 112 during winding, thereby causing the selected tape tract to misalign with tape head 120. In preferred embodiments, the vertical distance of tape media contact surface 211 not including channels 212 and 201 is in the range of 0.2 inches and 0.6 inches and preferably is 0.4988 inches.

Guide roller 108 is rotatably mounted on post 207. Guide roller 108 includes internal bearings and races to permit rotation around post 207. It should be noted that bearing and race quality are critical in roller guided tape paths because play introduced at the guide rollers from poor quality bearings affect alignment of the tape head and tape track. A preferred exemplary bearing and race combination is a straight double shielded ABEC 5 bearing (Annular Bearing Engineers Committee) and ABEC 5 race available from NMB Corporation of Chatsworth California. A spring 216 around the lower portion of post 207, and nut 208 threaded on the top portion of post 207, permit height adjustment of guide roller 108 relative to tape drive deck 206.

Guide Rollers 104 and 106

Figure 3:
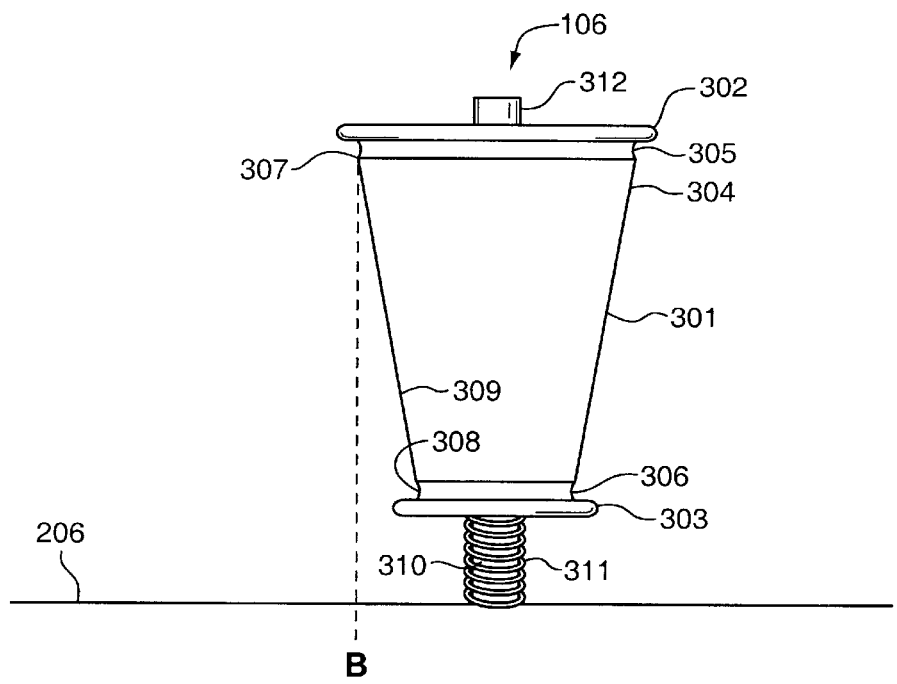
FIG. 3, illustrates a perspective view of a guide roller of the preset invention.

FIG. 3 illustrates a perspective view of guide roller 106 of the present invention. Guide roller 106 also comprises a pair of circular disks 302 and 303 integrally formed around the top and bottom of a main body 304. Main body 304 includes a tape media contact surface 301 circumscribing main body 304 and disposed between channels 305 and 306. Channels 305 and 306 are formed around the top and the bottom of tape media contact surface 301 and are functionally equivalent to channels 212 and 201 on guide roller 108.

Tape media contact surface 301 is tapered inward from top 307 to bottom 308 between channels 305 and 306. In preferred embodiments, the slope 309 of tape media contact surface 301 with respect to datum line B is in the range of 0.1 inches and 0.2 inches and more preferably is 0.143 inches. Similar to tape media contact surface 211 on guide roller 108, tape media contact surface 301 is dimensioned slightly wider than tape media 112 permitting tape media 112 to pass between disks 302 and 303 without contacting both simultaneously. In preferred embodiments, the vertical distance of tape media contact surface 301 not including channels 305 and 306 is in the range of 0.4985 inches and 0.4991 inches and more preferably is 0.4988 inches.

Guide roller 106 is rotatably mounted on post 310. Guide roller 106 includes internal bearings and races to permit rotation around post 310. As with guide roller 108 a preferred exemplary bearing and race combination is an ABEC 5 bearing and ABEC 5 race. A spring 311 around the lower portion of post 310, and nut 312 threaded on the top portion of post 310, permit height adjustment of guide roller 106 relative to tape drive deck 206.

Figure 4:
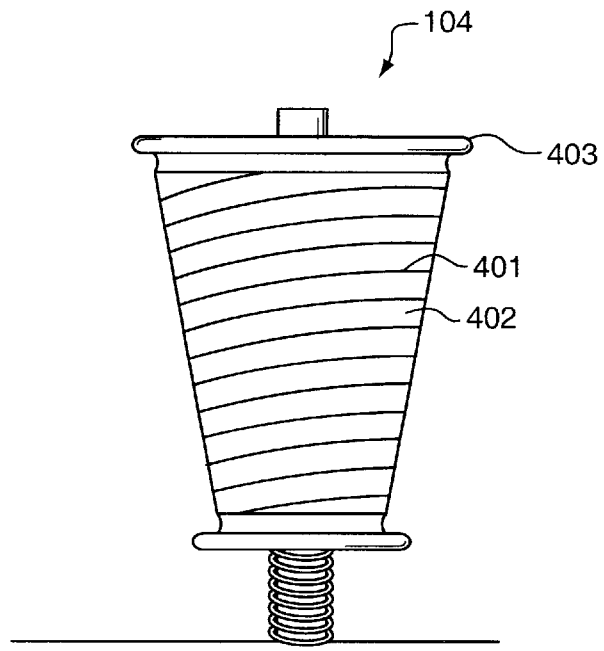
FIG. 4, illustrates a perspective view of a guide roller of the preset invention.

FIG. 4 illustrates a perspective view of guide roller 104 of the present invention. Guide roller 104 is identical to guide roller 106 with the exception of grooves 401 circumscribing tape media contact surface 402. Grooves 401 provide additional traction at guide roller 104 to maintain constant tension in tape media 112 and prevent tension buildup during tape drive operation. The traction prevents slipping of tape media 112 as it travels over guide rollers 102, 104, 106 and 108. Slipping causes errors in alignment of a specific tape track with tape head 120. Grooves 401 provide added traction and prevent slipping by bleeding excess air from between tape media contact surface 402 and tape media 112.

An especially preferred feature of the invention is the spiraling of grooves 401. Grooves 401 are configured to spiral around tape media contact surface 402 to reduce dipping. Dipping is a deformation of tape media 112 into grooves configured in a vertically parallel orientation. Dipping is caused by constant contact between the vertically parallel grooves and the same vertical location on tape media 112. The spiraling of grooves 401 continually changes the point of contact to reduce the dipping as tape media 112 passes over guide roller 104.

Figure 5:
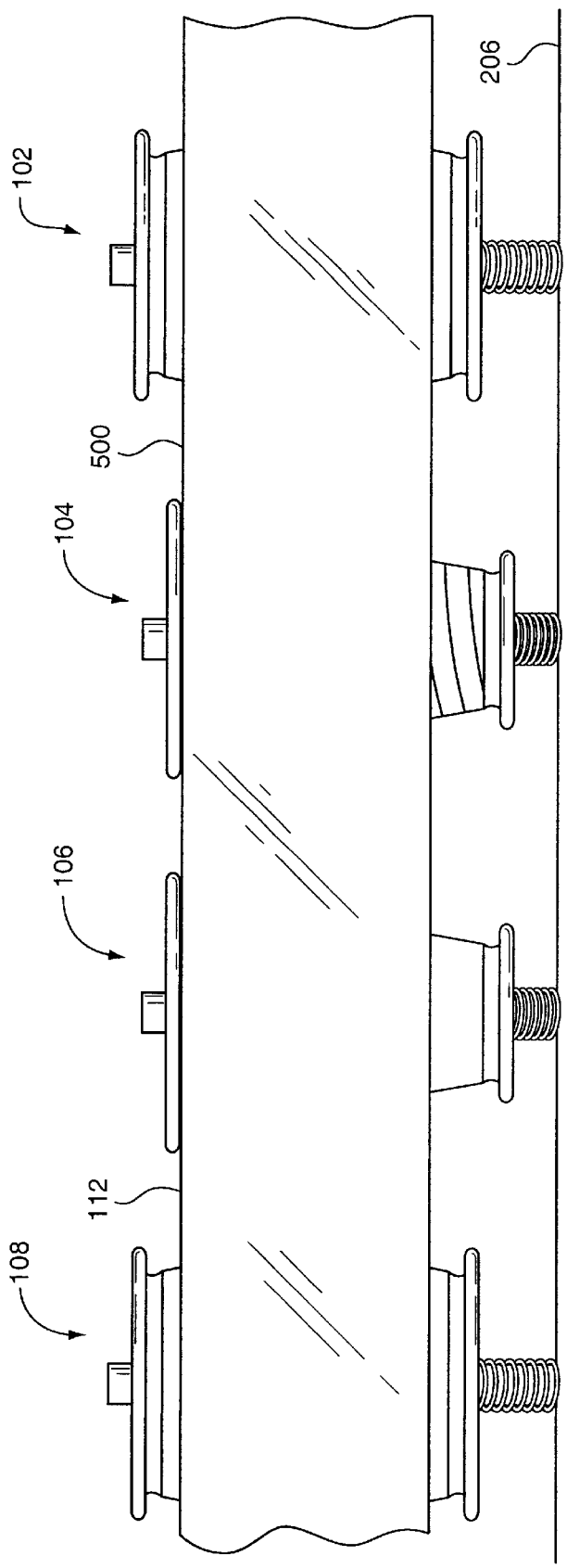
FIG. 5, illustrates the operation of the roller guiding system of the present invention.

FIG. 5 illustrates the operation of guide rollers 102, 104, 106 and 108. Guide rollers 102, 104, 106, and 108 are designed to guide tape media 112 over tape path 114 during operation of tape drive 100. Guide rollers 102, 104, 106, and 108 are also designed to adjust the path of travel to accommodate variations in tape media 112 and maintain alignment of a desired tape track with tape head 120. Some examples of variations in tape media 112 that affect alignment include but are not limited to, differences in tape width caused by tape cut, differences in tape width caused by tape stretch, and differences in tape width caused by inconsistencies in tape tension. One skilled in the art will appreciate that different tape drives have different operating speeds that cause tension variations when tape media 112 is wound around supply reel 116 for the final time before the tape cartridge is ejected. These tension variations are inherently present in tape cartridges used in multiple different tape drives.

The problem of accommodating variations in tape media 112 is further compounded by the fact that the variations are not constant between the tape media contained on different tape cartridges. For example, the cut of the tape media from one tape cartridge may vary slightly from the cut of the tape media of another tape cartridge. Additionally, tape stretch and tension are functions of the number of times the tape media is wound between a tape cartridge and a tape drive, and the operation of different tape drives.

The present roller guiding system is a dynamic guiding system. The roller guiding system utilizes the different configurations of guide rollers 102, 104, 106, and 108 to adjust tape media 112 to maintain a precise alignment between the desired tape track and tape head 120. To illustrate the operation of the present guiding system, guide rollers 102, 104, 106, and 108 are depicted in a straight-line configuration in FIG. 5, although one skilled in the art will recognize that operation of the guiding system is identical in the actual configuration depicted in FIG. 1.

Tapered guide rollers 106 and 104 maintain the alignment in the present guiding system. The tapered shape of guide rollers 106 and 104 in combination with the pulling of tape media 112 across guide rollers 106 and 104 applies an upward force on tape media 112. The upward force maintains constant contact between top edge 500 of tape media 112 and the underside of disks 302 and 403 on guide rollers 106 and 104. During operation of tape drive 100 the upward force on tape media 112 and counteracting downward forces from disks 302 and 403 moves tape media 112 up or down tape media contact surfaces 301 and 402 to accommodate changing tape width. If tape media 112 narrows during operation, the upward force causes tape media 112 to move up tape media contact surfaces 301 and 402 maintaining the constant contact at top edge 500. If tape media 112 widens during operation, disks 302 and 403 move tape media 112 down tape media contact surfaces 301 and 402 maintaining the constant contact at top edge 500. The constant height of top edge 500 serves not only to provide a reference point to determine track location on tape media 112 but also continually realigns the desired tape track with tape head 120 in response to realignment of top edge 500.

The amount of upward force on tape media 112 is especially critical. If the upward force on tape media 112 is excessive, tape media 112 is driven up and over disks 302 and 403. Likewise, if the upward force is insufficient, tape media 112 slips down away from disks 302 and 403. Both cases result in a misalignment of the desired tape track with tape head 120. Those skilled in the art will appreciate that the upward force can be adjusted for different tapes and different tape drives employing different speeds by varying the taper of tape media contact surfaces 301 and 402. Likewise, those skilled in the art will appreciate that localizing the upward force at guide rollers 106 and 104 aids in controlling the upward force to prevent problems associated with excessive or insufficient force application.

Another aspect of the roller guiding system is the height of guide rollers 108 and 102 relative to the height of guide rollers 104 and 106. Guide rollers 108 and 102 are configured to sit slightly higher off of tape deck 206 than guide rollers 106 and 104. In preferred embodiments, the height difference of guide rollers 108 and 102 is preferably in the range of 0.0004 inches and 0.0006 inches. The height difference compensates for realignment of tape media 112 during operation of tape drive 100 and prevents deformation of tape media 112 from undesired contact with disks 209 and 210 of guide rollers 108 and 102.

Guide rollers 108 and 102 further refine the travel path of tape media 112. Crown 214 on guide rollers 108 and 102, in combination with the rigid nature of tape media 112, reduces movement of tape media 112 in the vertical direction. This is especially advantageous during speed changes in tape drive 100. Speed changes affect the upward force on tape media 112 at guide rollers 104 and 106. Crown 214 in combination with the rigid nature of tape media 112 prevents slipping in the vertical direction during operation speed changes.

Figure 6:
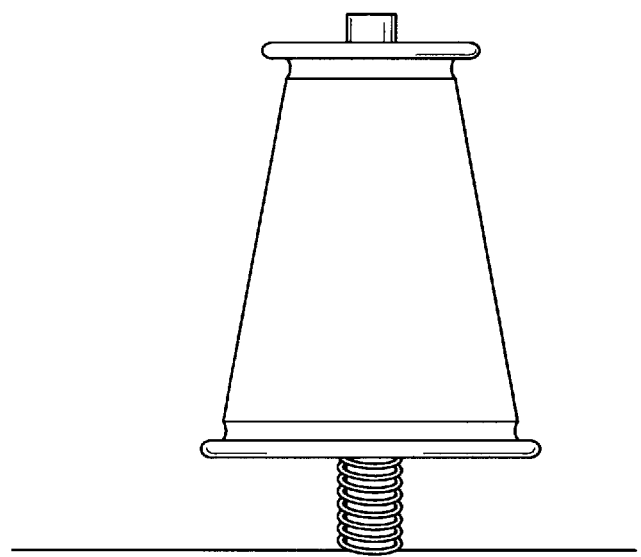
FIG. 6 illustrates a perspective view of a second embodiment of a guide roller of the preset invention.

In a second embodiment of the present invention, guide rollers 104 and 106 are inverted so that the taper on tape media contact surfaces 301 and 402 travels from a widest point at the bottom of guide rollers 104 and 106 to a narrowest point at the top of guide rollers 104 and 106, as illustrated by FIG. 6. All other aspects of the invention including operation remain the same.

As to alternative embodiments, the present tape guiding system can be used in other equipment having a guide roller path to achieve precise positioning and orientation of various media. Some examples include but are not limited to, a videocassette recorder (VCR), video cameras, or film projectors.

It is apparent that there has been described, a roller guiding system, that fully satisfies the objects, aims, and advantages set forth above. While the invention has been described in conjunction with specific embodiments thereof, it is evident that those skilled in the art can devise many alternatives, modifications, and/or configurations in light of the foregoing description. Accordingly, this description is intended to embrace all such alternatives, modifications and variations as fall within the spirit and scope of the appended claims.

What is claimed is:

1. An improved roller guiding system for delivery of magnetic tape media along a tape path between a tape drive employing a single reel and a tape cartridge employing a single reel, comprising:
 a first pair of guide rollers, including a first guide roller and a second guide roller each comprising:
  a first main body having a first circular disk integrally formed around a top of the first main body and a second circular disk integrally formed around a bottom of the first main body; and
  a first tape media contact surface disposed between the first circular disk and second circular disk circumscribing the first main body and including a central crown;
 a second pair of guide rollers including a third guide roller and a fourth guide roller each comprising:
  a second main body having a third circular disk integrally formed around a top of the second main body and a fourth circular disk integrally formed around a bottom of the second main body; and
  a second tape media contact surface disposed between the third circular disk and the fourth circular disk circumscribing the main body, the second tape media contact surface being tapered.

2. The guiding system of claim 1, further comprising:
 a plurality of grooves defined in the second tape media contact surface of at least one of the second pair of guide rollers for controlling tension of the tape media.

3. The guiding system of claim 2, wherein the plurality of grooves are spiraled around the second tape media contact surface of the at least one of the second pair of guide rollers.

4. The guiding system of claim 1, wherein a tape head is connected to the tape drive between the third guide roller and fourth guide roller and the third guide roller and fourth guide roller are connected to the tape drive between the first guide roller and second guide roller so that the tape media is wound from the first guide roller to the third guide roller and over the tape head to the fourth guide roller and from the fourth guide roller to the second guide roller.

* * * * *